US006656045B2

(12) United States Patent
Wei et al.

(10) Patent No.: US 6,656,045 B2
(45) Date of Patent: *Dec. 2, 2003

(54) METHOD AND SYSTEM FOR STORING PRESELECTED NUMBERS FOR USE IN GAMES OF BINGO

(75) Inventors: William Wei, Williamston, MI (US); Jeffery A. Dettloff, Lansing, MI (US); Ronald J. Austin, Lansing, MI (US); Richard G. Bean, Lansing, MI (US); Harrold J. Rappold, Laingsburg, MI (US); James L. Green, Grand Ledge, MI (US)

(73) Assignee: Melange Computer Services, Inc., Lansing, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/160,725

(22) Filed: Jun. 3, 2002

(65) Prior Publication Data

US 2003/0003986 A1 Jan. 2, 2003

Related U.S. Application Data

(63) Continuation of application No. 09/478,685, filed on Jan. 6, 2000, now Pat. No. 6,398,646.

(51) Int. Cl.[7] .................................................. A63F 13/12

(52) U.S. Cl. ............................ 463/19; 463/16; 463/17; 463/18; 463/20; 463/21; 463/22

(58) Field of Search .................. 463/16–22; 273/143 R

(56) References Cited

U.S. PATENT DOCUMENTS

| | | | | |
|---|---|---|---|---|
| 4,909,516 A | | 3/1990 | Kolinsky | |
| 5,007,649 A | | 4/1991 | Richardson | |
| 5,472,209 A | * | 12/1995 | Goldfarb | 273/269 |
| 5,687,971 A | | 11/1997 | Khaladkar | |
| 5,890,432 A | | 4/1999 | Rogaliner et al. | |
| 6,086,477 A | * | 7/2000 | Walker et al. | 463/17 |

* cited by examiner

*Primary Examiner*—Jessica Harrison
*Assistant Examiner*—Carmen D. White
(74) *Attorney, Agent, or Firm*—Mary M. Moyne; Ian C. McLeod

(57) ABSTRACT

A method and system (10) for storing preselected Bingo numbers which allows a player to play the same sets of Bingo numbers (56) in multiple sessions of Bingo. The player preselects Bingo numbers to play in multiple Bingo sessions. The numbers are stored in the memory (16) of the computer (12). The player selects which preselected Bingo numbers to play for a specific session of Bingo. A ticket is provided having the selected sets of Bingo numbers with a control number (58) for each selected set of numbers and a validation number (60) for the ticket.

30 Claims, 11 Drawing Sheets

Validation #: 001548704 — 60
General Public

| Qty | Description | Each | Price |
|---|---|---|---|
| 1 | VIPick-em(9) | 5.00 | 5.00 |

Total Value of Sales: 5.00
Amount Due: 5.00
Amount Received: 5.00 ← 50
Change Due: 0.00

EPICTEST-Rons
Night Session
13:13:25 04/15/99
Register: RONSTA
Operator: MELANGE
All coupons MUST be used on the same day they are validated. GOOD LUCK!!!

FIG. 2

==================== ====================

Start of DO-IT-YOURSELF Ticket

Validation #: 001548704 — 60
General Public
04/15/99 Night Session

---

0001598* 2 11 19 27 29 33 36 37

0001599* 1 2 19 21 28 49 61 75

0001600* 3 13 15 18 36 42 60 61 ← 52

0001601* 13 19 26 34 47 56 59 65

0001602* 6 11 14 18 39 48 63 66

0001603* 4 13 14 17 22 26 56 59

0001604* 16 23 25 35 36 40 54 67

0001605* 7 18 19 25 27 62 64 67

0001606* 19 25 50 52 61 62 64 74

---

End of DO-IT-YOURSELF Ticket

========================================

FIG. 3

Do-It-Yourself

General Public Night Session 04/15/99 Validation No: 001548704 60

| | | | | | | | | |
|---|---|---|---|---|---|---|---|---|
| 1598 | 2 | 11 | 19 | 27 | 29 | 33 | 36 | 37 |
| 1599 | 1 | 2 | 19 | 21 | 28 | 49 | 61 | 75 |
| 1600 | 3 | 13 | 15 | 18 | 36 | 42 | 60 | 61 |
| 1601 | 13 | 19 | 26 | 34 | 47 | 56 | 59 | 65 |
| 1602 | 6 | 11 | 14 | 18 | 39 | 48 | 63 | 66 |
| 1603 | 4 | 13 | 14 | 17 | 22 | 26 | 56 | 59 |
| 1604 | 16 | 23 | 25 | 35 | 36 | 40 | 54 | 67 |
| 1605 | 7 | 18 | 19 | 25 | 27 | 62 | 64 | 67 |
| 1606 | 19 | 25 | 50 | 52 | 61 | 62 | 64 | 74 |

58 56

54

Must have Original Receipt for Verification

This game sheet is for convenience only,
all winners will be verified from original receipt.

Please compare the numbers on this game sheet to your original receipt.

FIG. 4

Validation #; 001548705 — 60
RON AUSTIN
VIP #: 000000012 — 62

---

| Qty | Description | Each | Price |
|---|---|---|---|
| 1 | VIPick-em(9) | 5.00 | 5.00 |

---

Total Value of Sales: 5.00
Amount Due: 5.00 — 50
Amount Received: 5.00
Change Due: 0.00

---

Beg. Point Total: 981,993.00
Points Redeemed: 0.00
Points Earned: 5.00
New Point Total: 981,998.00
Dollar Value of Points: $9,819.98

---

EPICTEST-Rons
Night Session
13:14:51 04/15/99
Register: RONSTA
Operator: MELANGE
All coupons MUST be used on the same day they are validated. GOOD LUCK!!!

FIG. 5

==================== ====================

Start of DO-IT-YOURSELF Ticket

Validation #: 001548705 60

RON AUSTIN

04/15/99 Night Session

58

| | | | | | | | | |
|---|---|---|---|---|---|---|---|---|
| 0001607 | 10 | 14 | 20 | 21 | 43 | 61 | 64 | 73 |
| 0001608 | 14 | 22 | 30 | 42 | 52 | 62 | 67 | 73 |
| 0001609 | 13 | 15 | 17 | 30 | 34 | 40 | 53 | 73 |
| 0001610 | 4 | 15 | 33 | 35 | 37 | 43 | 52 | 74 |
| 0001611 | 6 | 13 | 15 | 61 | 64 | 68 | 73 | 75 |
| 0001612 | 18 | 23 | 34 | 36 | 39 | 43 | 44 | 46 |
| 0001613 | 13 | 17 | 31 | 45 | 54 | 58 | 60 | 73 |
| 0001614 | 7 | 8 | 14 | 21 | 38 | 57 | 63 | 75 |
| 0001615 | 7 | 12 | 13 | 16 | 22 | 44 | 53 | 57 |

52

56

End of DO-IT-YOURSELF Ticket

========================================

FIG. 6

Do-It-Yourself

RON AUSTIN Night Session 04/15/99 Validation No: 001548704 60

| | | | | | | | | |
|---|---|---|---|---|---|---|---|---|
| 1607 | 10 | 14 | 20 | 21 | 43 | 61 | 64 | 73 |
| 1608 | 14 | 22 | 30 | 42 | 52 | 62 | 67 | 73 |
| 1609 | 13 | 15 | 17 | 30 | 34 | 40 | 53 | 73 |
| 1610 | 4 | 15 | 33 | 35 | 37 | 43 | 52 | 74 |
| 1611 | 6 | 13 | 15 | 61 | 64 | 68 | 73 | 75 |
| 1612 | 18 | 23 | 34 | 36 | 39 | 43 | 44 | 46 |
| 1613 | 13 | 17 | 31 | 45 | 54 | 58 | 60 | 73 |
| 1614 | 7 | 8 | 14 | 21 | 38 | 57 | 63 | 75 |
| 1615 | 7 | 12 | 13 | 16 | 22 | 44 | 53 | 57 |

58 56

54

Must have Original Receipt for Verification

This game sheet is for convenience only,
all winners will be verified from original receipt.

Please compare the numbers on this game sheet to your original receipt.

FIG. 7

METHOD AND SYSTEM FOR STORING PRESELECTED NUMBERS FOR USE IN GAMES OF BINGO

This application is a continuation of application Ser. No. 09/478,685 filed on Jan. 6, 2000, now U.S. Pat. No. 6,398,646.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "COMPUTER LISTING APPENDIX SUBMITTED ON A COMPACT DISC"

A Computer Program Listing Appendix on a compact disc is submitted with this application. A duplicate copy of the compact disc is also submitted with this application. Each compact disc contains a file entitled "VIPickem.txt". The file was created on Jun. 3, 2002 and is 314,671 bytes in size. The material contained on the compact disc is incorporated herein by reference.

BACKGROUND OF THE INVENTION (1) Field of the Invention

The present invention relates to an automated Bingo system having the ability to print sets of numbers on tickets on site. The system uses a computer to print the tickets, track the sale of the tickets and to validate winning tickets. In particular, the present invention relates to an automated system for playing Bingo where a computer stores the specific sets of Bingo numbers for a player and prints the tickets having the player's specific set of Bingo numbers to enable the player to play his specific Bingo numbers for various sessions of Bingo.

(2) Description of the Related Art

The related art has shown various automated Bingo games where a computer is used to produce and track the game boards and to validate the winning game boards on site. Illustrative are U.S. Pat. Nos. 5,007,649 to Richardson and 5,687,971 to Khaladkar.

Richardson describes an automatic gaming system having a system base station, electronic gaming boards and validation units. The base station of the system includes a gaming library which contains a plurality of gaming cards created beforehand by the players. This allows the players to select the numbers on their cards. The gaming cards are downloaded from the base station into the electronic gaming boards. The base station retains auditing information about the downloaded cards. A validation code can also be downloaded into the electronic gaming boards. The electronic gaming boards can also have timers to prevent changing the gaming boards once the game has begun.

Khaladkar describes a Bingo system using a computer to print Bingo cards on site and to track the sale of the cards. The system generates a fixed series of cards. The series needs to be fixed in order to keep track of the cards in the game. The system extracts from the data memory, a plurality of series of the Bingo cards which are different and separate and there is no duplication within a series or between series of the Bingo cards set forth in that series. The system uses a single paper for the entire book of Bingo cards to avoid possible tampering. Each Bingo card is associated with a serial number which identifies the particular Bingo card uniquely so that each Bingo card can be retrieved from the memory by entry into the memory of the serial number. The serial number on the card is used to verify the winner. Cards are preprinted before the game. The customer does not select numbers on the cards. The system can also be used with video display Bingo cards.

Also, of interest is U.S. Pat. No. 4,909,516 to Kolinsk which describes a computerized Bingo game where the computer plays all the Bingo cards simultaneously.

Only of minimal interest is U.S. Pat. No. 5,890,432 to Rogaliner et al which describes a method of manufacturing Bingo paper.

There remains the need for an automated Bingo system which allows players to select their own numbers and store their numbers in the automated system for use in later sessions of Bingo. The present invention allows for the printing of game tickets on site having the player's preselected sets of Bingo numbers and for tracking and validating the sets of numbers using the automated system.

SUMMARY OF THE INVENTION

The present invention relates to a method and system for managing a Bingo game. The method and system of the present invention allow repeat players to easily play their favorite sets of numbers in multiple sessions of Bingo. The method and system also allow the hall to track the sale of Bingo tickets, easily verify the Bingo winners and keep track of VIP or repeat players. The use of the computer with the accounting, ticket and receipt and the verification programs allows for on site, point-of-sale printing of tickets with minimal risk of tampering. The system enables players to store preselected Bingo numbers or sets of Bingo numbers in the memory or database of the computer. The Bingo numbers are then-able to be retrieved by a player when the player wishes to play the preselected Bingo numbers in a Bingo game. In the method of using the system, the VIP player preselects numbers which he wishes to play in multiple Bingo sessions. The hall enters the numbers into the memory of the computer. On the date of the Bingo game, the VIP player gives the hall his VIP player identification number. The hall enters the VIP player identification number into the computer and the VIP player's preselected numbers are displayed on the display of the computer. The VIP player then chooses which preselected Bingo numbers to play in the particular game. The VIP player pays for the Bingo numbers. The VIP player can pay for the numbers using VIP points which the player has accumulated from previous games. Upon paying for the numbers, the player is provided with a ticket. The ticket includes the preselected numbers with a control number for each set of numbers and a validation number for the ticket. The sets of numbers are printed on a ticket. The player has the option of also having the sets of numbers downloaded into an electronic Bingo device. The ticket can also be enlarged to a game board by the system at the player's option. The VIP player is also provided with a receipt indicating the number of preselected sets of numbers which the player bought, the validation number for the ticket and the time and date of the Bingo game for which the ticket is valid. The receipt may also list the sales agent and the identification number of the computer which sold the ticket. The Bingo game is then played with the called Bingo numbers being entered into the computer.

When a player calls BINGO, the hall enters the control number of the potentially winning set of Bingo numbers into the computer. The computer will instantly notify the hall whether or not the player has a winning set of Bingo numbers. To collect his prize, the player must present his receipt having the correct validation number.

The present invention relates to a system for managing a game of Bingo which comprises: a computer with a central processing unit (CPU) and with a memory and with a printer connected to the CPU; an input and output terminal connected to the CPU and memory of the computer; and a program in the computer enabling: (i) input of at least one set of numbers which is preselected by a player for repetitive play in games of Bingo over a period of time; (ii) addition by the computer of a control number for each set of numbers which is preselected by the player; (iii) output of a receipt with the control number, the set of numbers which is preselected, a price for the set of numbers which is preselected, a date of the game of Bingo and optionally a computer identification number; and (iv) output for verification of a winning set of numbers by means of the control number which is input into the computer by a manager of the game of Bingo.

Further, the present invention relates to a method for playing a game of Bingo which comprises the steps of: providing a system for managing a game of Bingo which comprises: a computer with a central processing unit (CPU) and with a memory and with a printer connected to the CPU; an input and output terminal connected to the CPU and memory of the computer; and a program in the computer enabling: (i) input of a set of numbers which is preselected by a player for repetitive play in games of Bingo over a period of time; (ii) addition by the computer of a control number for the set of numbers which is preselected by the player; (iii) output of a receipt with the control number, the set of numbers which is preselected, a price for the set of numbers which is preselected, a date of the game of Bingo and optionally a computer identification number; and (iv) output for verification of a winning set of numbers by means of the control number which is input into the computer by a manager of the game of Bingo; playing the game of Bingo using the set of numbers; and verifying the winning set of numbers with the control number with the program.

Still further, the present invention relates to a method using a programmable computer to track a set of numbers selected by a player to be played in a game of Bingo which comprises the steps of: receiving the set of numbers selected by the player to be played in the game of Bingo; assigning a control identifier to the set of numbers; storing the set of numbers and the control identifier on a computer readable medium; displaying the set of numbers to be played in the game of Bingo along with the control identifier; receiving a potentially winning control identifier corresponding to a potentially winning set of numbers after the game of Bingo has been played; and displaying the set of numbers corresponding to the potentially winning control identifier to determine whether the potentially winning set of numbers is a winning set of numbers.

Further still, the present invention relates to a method using a programmable computer to track a set of numbers selected by a player to be played in a game of Bingo which comprises the steps of: receiving a preselected set of numbers; assigning a player identifier to a group having the preselected set of numbers wherein all preselected sets of numbers corresponding to one player belong to one group and are assigned one player identifier; storing the preselected set of numbers and the player identifier on a computer readable medium; receiving the player identifier for the player to retrieve the group having the preselected set of numbers corresponding to the player; receiving the set of numbers to be played in the game of Bingo from the preselected set of numbers; assigning a control identifier for the set of numbers to be played in the game of Bingo; storing the control identifier for the set of numbers to be played in the game of Bingo on the computer readable medium; displaying the set of numbers to be played in the game of Bingo along with the corresponding control identifier; receiving a potentially winning control identifier corresponding to a potentially winning set of numbers after the game of Bingo has been played; and displaying the set of numbers corresponding to the potentially winning control identifier to determine whether the potentially winning set of numbers is a winning set of numbers.

The substance and advantages of the present invention will become increasingly apparent by reference to the following drawings and the description.

BRIEF DESCRIPTION OF THE DRAWING(S)

FIG. 2 is a printout of a player receipt 50 for a one time player.

FIG. 3 is a printout of a player ticket 52 for a one time player.

FIG. 4 is a printout of a game board 54 for a one time player.

FIG. 5 is a printout of a player receipt 50 for a VIP player.

FIG. 6 is a printout of a player ticket 52 for a VIP player.

FIG. 7 is a printout of a game board 54 for a VIP player.

DESCRIPTION OF THE PREFERRED EMBODIMENT(S)

Figure 1:
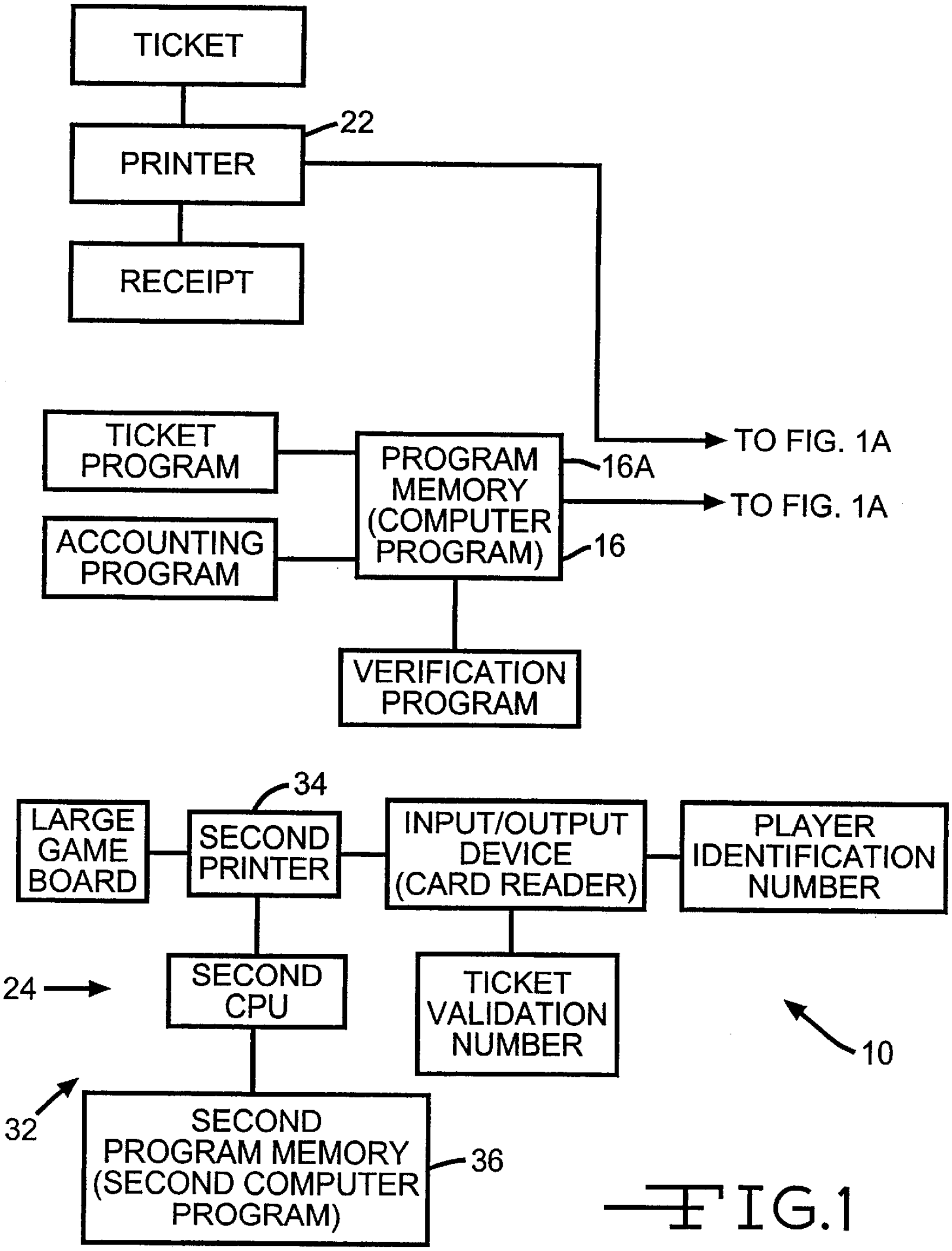
FIGS. 1 and 1A are schematic representations of the system 10 of the present invention.

The automated Bingo system 10 of the present invention allows for managing all aspects of a Bingo game. The system 10 preferably can be used with any version of the game of Bingo. In the preferred embodiment, the system 10 is used with a version of Bingo commonly referred to as "U-PICK-EM", "PICK", "PICK 7", "PICK 6", "SELECT 8", "PICK 8" and "DO IT YOURSELF". In this version of the game of Bingo, a player or the computer selects sets of numbers to be played in the game. Each set of numbers has the same amount of numbers. For example, for the game entitled "PICK 7", all sets of numbers would have seven (7) numbers. The sets of numbers are displayed in horizontal rows. Preferably, the numbers range from 1 to 75; although, any range of numbers can be used. The hall or manager of the Bingo session calls the Bingo numbers in the range of numbers available for the particular game. Unlike standard Bingo, a letter in the word BINGO is not associated with the numbers. As the hall calls the numbers, the players mark their ticket or game boards. To win, a player must mark all numbers in a set of numbers which corresponds to marking one (1) horizontal row. In an alternative version of the "UPICK-EM" Bingo game, the hall has a second jackpot called a "hot ball", "fish bowl", "pickle jar" or "cookie jar". To win this second jackpot, a player must achieve a winning Bingo configuration on a predetermined Bingo number as selected by the hall. Another alternative version of the "U-PICK-EM" Bingo game is the matrix option. In this version, a player or computer chooses the same number of sets of numbers as there are numbers in the set. For example, 5 sets of 5 numbers, 6 sets of 6 numbers, 7 sets of 7 numbers, etc. The sets are arranged in rows and columns with the number of rows equal to the number of columns. A player can win by marking all the numbers in either a row or column. For example, a ticket for a matrix version having 8 sets of 8 numbers would have 64 numbers with 16 sets of numbers in play allowing 16 different ways to achieve Bingo. The system 10 also allows for two (2) different types of Bingo players. The first type of player is a VIP or repeat player. A VIP player is a player who has played Bingo at the hall in the past and consistently plays Bingo at the hall. The second type of player is a general public player. A general public player is not a consistently, repeat player at the hall.

Figure 1A:
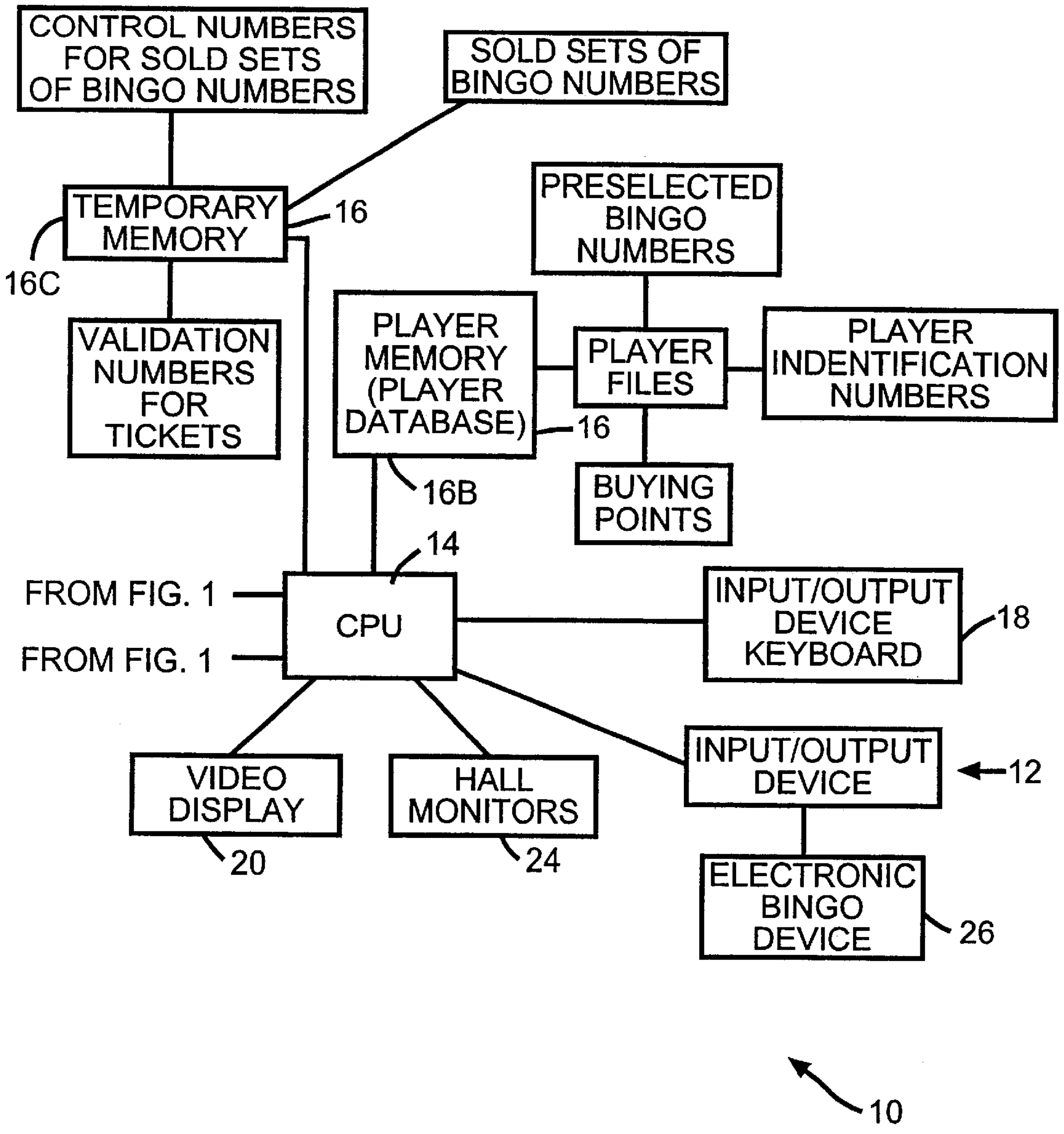

As shown in FIGS. 1 and 1A, the system 10 of the present invention includes a computer 12 having a CPU 14, a display or monitor 20, at least one (1) input/output device 18 and a printer 22. A second computer 32 with a second printer 34 may also be included in the system 10. The memory 16 of the computer 12 includes a computer memory 16 having a computer program 16 A which allows for managing most aspects of the Bingo game. The computer program 16 A is able to keep track of all the accounting involved in running a Bingo game, prepare the ticket 52 for the player and verify a winning set of Bingo numbers 56 and a winning ticket 52. In particular, the computer program 16 A includes an accounting program which keeps track of the number of sets of numbers 56 sold for a specific Bingo game as well as the amount of money or number of buying points paid for each set of numbers 56. The accounting program also allows for printing a receipt 50 for a player confirming the purchase of the sets of numbers 56. The accounting program is able to keep track of the amount of money paid to various winners during each session. The accounting program also allows for special pricing of set(s) of numbers. For example, a player may receive a discount for purchasing multiple sets of numbers 56. Preferably, the accounting program used in the system 10 is similar to the EPICT™ accounting program sold by Melange Computer Services, Inc. The computer program also includes a ticket program which prints tickets 52 having the sets of numbers 56 bought by the player at the point of sale. Alternatively, the ticket program downloads the ticket 52 into a portable electronic Bingo device 26 at the point of sale. Finally, the computer program includes a verification program. The verification program allows the hall to quickly and accurately verify that a ticket 52 has a winning set of Bingo numbers 56 and that the ticket 52 was valid for the particular Bingo game. An example of a computer program which will perform the method of the present invention is "VIPickem.txt" which is contained in the computer program listing appendix located on the compact disc submitted herewith and is incorporated herein by reference.

Figure 8:
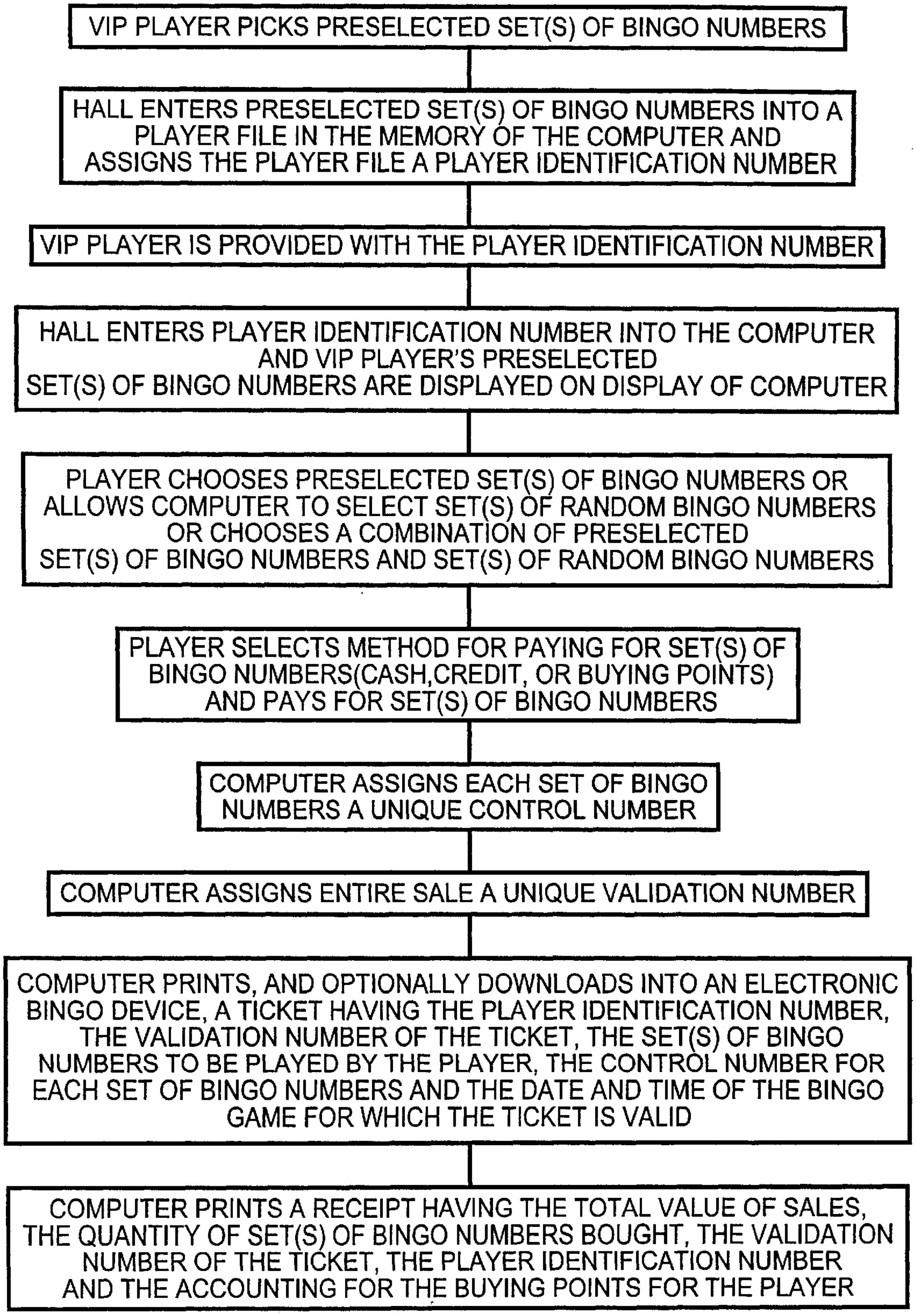
FIG. 8 is a flowchart showing the method of using the Bingo system 10 to purchase numbers for a Bingo game by a VIP player.

The memory 16 of the computer 12 also includes a player database 16 B having player files. The player files contain the favorite set or sets of Bingo numbers 56 which each VIP player likes to play for multiple sessions of the game of Bingo (FIG. 8). If the player is a general public player, then the player does not have a player file. The sets of Bingo numbers 56 in the player file are preselected by the player and are input into the player file. The player file is then given a player identification number 62 which is given to the VIP player. The player identification number 62 can be encoded on a magnetic strip on a VIP card (not shown). In the preferred embodiment, the preselected sets of Bingo numbers 56 are only entered once into the player database 16 B. In the preferred embodiment a VIP player is able to modify the preselected sets of numbers 56 in a player file at any time. Preferably, the player database 16 B can have an unlimited number of player files. In addition, preferably each player file has subfiles for each different version of the Bingo game. Thus, each subfile would include sets of Bingo numbers 56 which a VIP player has preselected to play in a specific version of the Bingo game. These subfiles are important where a hall plays several versions of Bingo. Preferably inactive player files which have not been accessed for a predetermined period of time are deleted from the player database 16 B. The memory 16 of the computer 12 also includes a temporary memory 16 C. The temporary memory 16 C includes the sets of numbers 56 selected by a player for a specific session of Bingo. The temporary memory 16 C also includes the control numbers 58 and the validation number 60 relating to a specific session of Bingo. The temporary memory 16 C is preferably erased after each session of Bingo.

Figure 9:
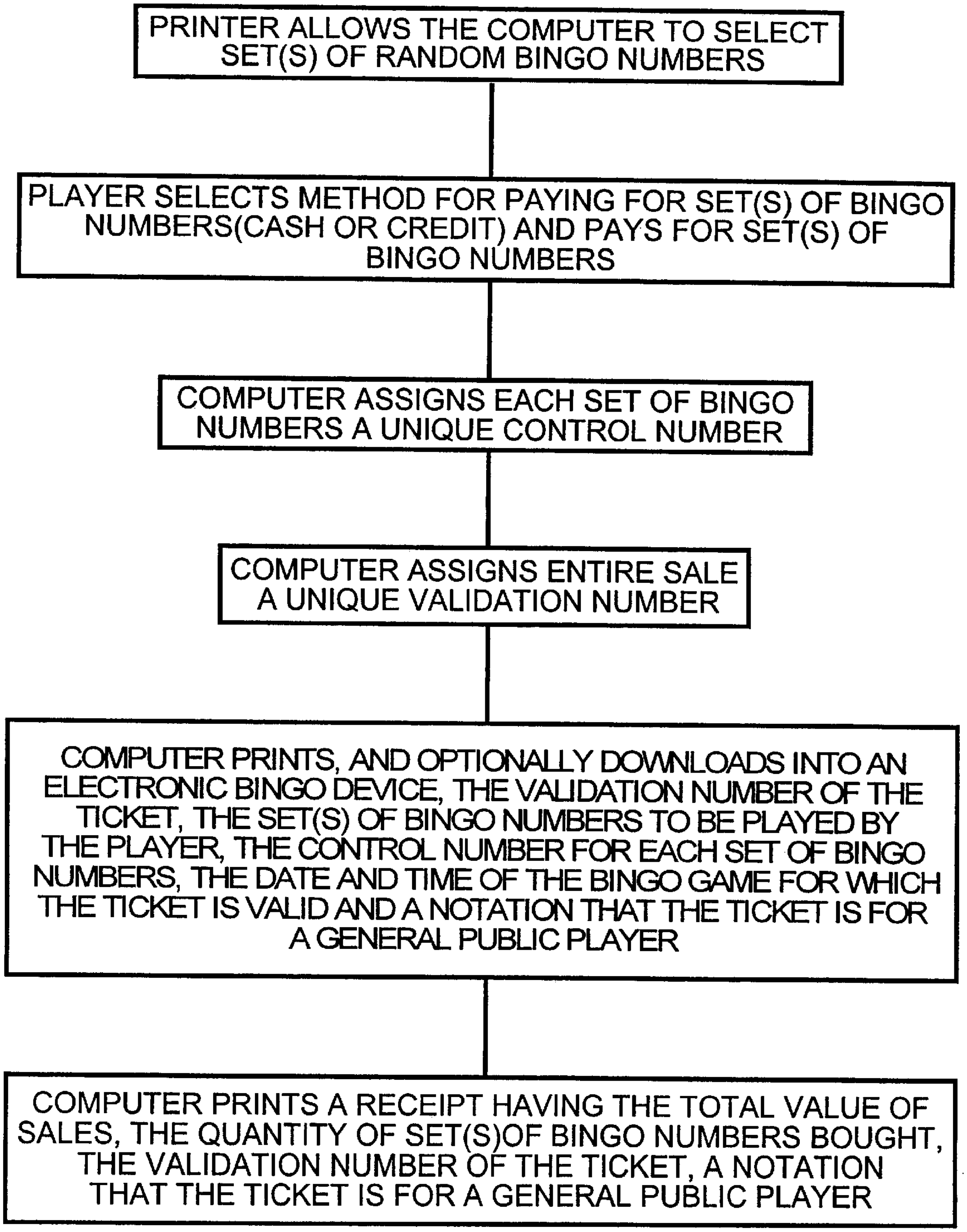
FIG. 9 is a flowchart showing the method of using the system 10 to purchase Bingo numbers for a Bingo game by a general public player.

For a VIP player to use the system 10, the VIP player swipes his player identification card through a reader at the cashier counter where the Bingo tickets 52 are sold (FIG. 8). Alternatively, the cashier or computer operator types the player identification number 62 into the computer 12 using the input/output device 18 which is preferably a keyboard. The player's name may be inputted into the computer 12 to obtain the player's identification number 62. The VIP player's player file is then displayed on the video display, video screen or monitor 20 of the computer system 10. If the player's file contains subfiles then the player or cashier selects the subfile which corresponds to the version of the Bingo game which is to be played. The VIP player then selects the sets of numbers 56 he wishes to play. In combination with the sets of numbers 56 he selects, the VIP player can, also have the computer 12 select random. sets of numbers 56. Alternatively, the VIP player can choose to play only computer selected sets of random Bingo numbers 56. For a general public player, to purchase sets of numbers 56 for a Bingo game, the general public player indicates to the cashier how many sets of numbers 56 he wishes to play (FIG. 9). The computer 12 then randomly picks the numbers for the number of sets of numbers 56 to be purchased by the player. These sets of numbers 56 may be displayed on the monitor 20 of the computer 12 prior to the player buying the sets of numbers 56. It is possible that a player may request that the computer 12 reselect the sets of numbers 56 if the player does not like the sets of numbers 56 originally selected by the computer 12. If a general player would like to choose specific sets of numbers 56, a player can start a player file directly prior to a game and become a VIP player.

Once the sets of numbers 56 are selected, the computer 12 assigns each set of numbers 56 a unique control number 58 (FIGS. 3 and 6). If the game is a matrix game, the columns as well as the rows are provided with a control number 58. The accounting program then calculates the cost of the sets of numbers 56 to be played by the player. The VIP player then pays for the sets of numbers 56. The VIP player can pay by cash or credit. In the preferred embodiment, the credit card information for a client is stored in the player file which eliminates the need for the player to produce a credit card.

The player can also purchase sets of numbers 56 using buying points. Buying points are points earned by a player during previous games. The points result from a winning Bingo by a player. Alternatively, the player earns buying points based on the amount of sets of numbers 56 he purchases. Preferably, the accounting program calculates the total buying points a player has after each sale to a player and after each Bingo game, the total is then stored in the player's file in the player database 16B of the computer 12. In the preferred embodiment, the number of buying points a player has in his account is displayed on the monitor 20 along with the preselected set of numbers 56, when the VIP player identification number 62 is entered into the computer 12. However, a general public player can not purchase sets of numbers 56 using buying points since the player does not have a player file or an account to track his buying points. In addition, buying points are not awarded to general public players since there is no player file for those players. Once the VIP or general public player purchases the sets of numbers 56, the computer 12 assigns the transaction or sale a single, unique validation number 60. The player then receives a ticket 52 and a receipt 50. The computer 12 also stores the sets of numbers 56 sold, the corresponding control numbers 58 and the validation number 60 in a temporary memory 16C. The temporary memory 16C preferably also includes the time and date of the particular session which the sets of numbers 56 and ticket 52 are valid. In the preferred embodiment, the information for a particular session of Bingo is deleted from the temporary memory 16C after. a predetermined amount of time.

The ticket 52 issued to the player is printed on a printer 22 of the computer 12 (FIGS. 3 and 6). The printed ticket 52 is preferably the size of a standard store receipt. In addition, the ticket 52 can be downloaded into an electronic Bingo device 26. The ticket 52 preferably has a listing of the sets of numbers 56 to be played by the player. The sets of numbers 56 are preferably arranged in horizontal rows. Each set of numbers 56 is provided with a unique transaction control number 58. The unique control number 58 for each set of numbers 56 is preferably adjacent each row having the set of numbers 56. For a matrix session, the control numbers 58 are preferably adjacent each row and at the top or bottom of each column. The ticket 52 also has the validation number 60 for that ticket 52 or sale. In addition, the time and date of the game is indicated on the ticket 52. If the player is a VIP player, the ticket 52 also preferably includes the player's name or player identification number 62. If the player is a general public player, then the ticket 52 preferably includes the words "general public" or includes a standard general public identification number. Once the sale is made and the ticket 52 is provided to the player, the player may enter his identification number 62 or the validation number 60 into a second computer 32 having a second program memory 36 with a second computer program. The second printer 34 prints a large game sheet or game board 54 having the sets of numbers 56 (FIGS. 4 and 7). The larger game board 54 preferably includes the same information as the original ticket 52. The larger game board 54 makes it easier for a player to mark his card.

The player is also provided with a receipt 50. The receipt 50 preferably has the validation number 60, the amount of sets of numbers 56 purchased, the session of the game for which the sets of numbers 56 were purchased, the total value of the sales of the sets of numbers 56 and the amount due, amount received and change due for the sale (FIGS. 2 and 5). The receipt 50 also preferably includes the date and time the sets of numbers 56 were purchased, the name of the hall having the Bingo game, the identification of the computer 12 which sold the sets of numbers 56 and the identification of the operator of the computer 12. If the player is a VIP player, the ticket 52 may also include a buying point transaction accounting including the buying point total, the points redeemed, points earned, the new point total and the dollar value of the points (FIG. 5).

In the preferred embodiment, only one (1) Bingo game is on sale at one time. However, it is possible that multiple Bingo games could be sold at the same time. Preferably, all sets of numbers 56 for a particular game must be purchased the day of the game. The sales of sets of numbers 56 for a particular session of Bingo are preferably stopped 5 minutes before the start of the game. This prevents players from selecting sets having numbers which have already been called. In an alternative embodiment, the sets of numbers 56 must be purchased directly before the-game. In the preferred embodiment, the computer 12 keeps track of only one game and the sets of numbers 56 for that game. Preferably, the sets of numbers 56 for a specific game would be printed on a single ticket 52 with a corresponding separate receipt 50.

Figure 10:
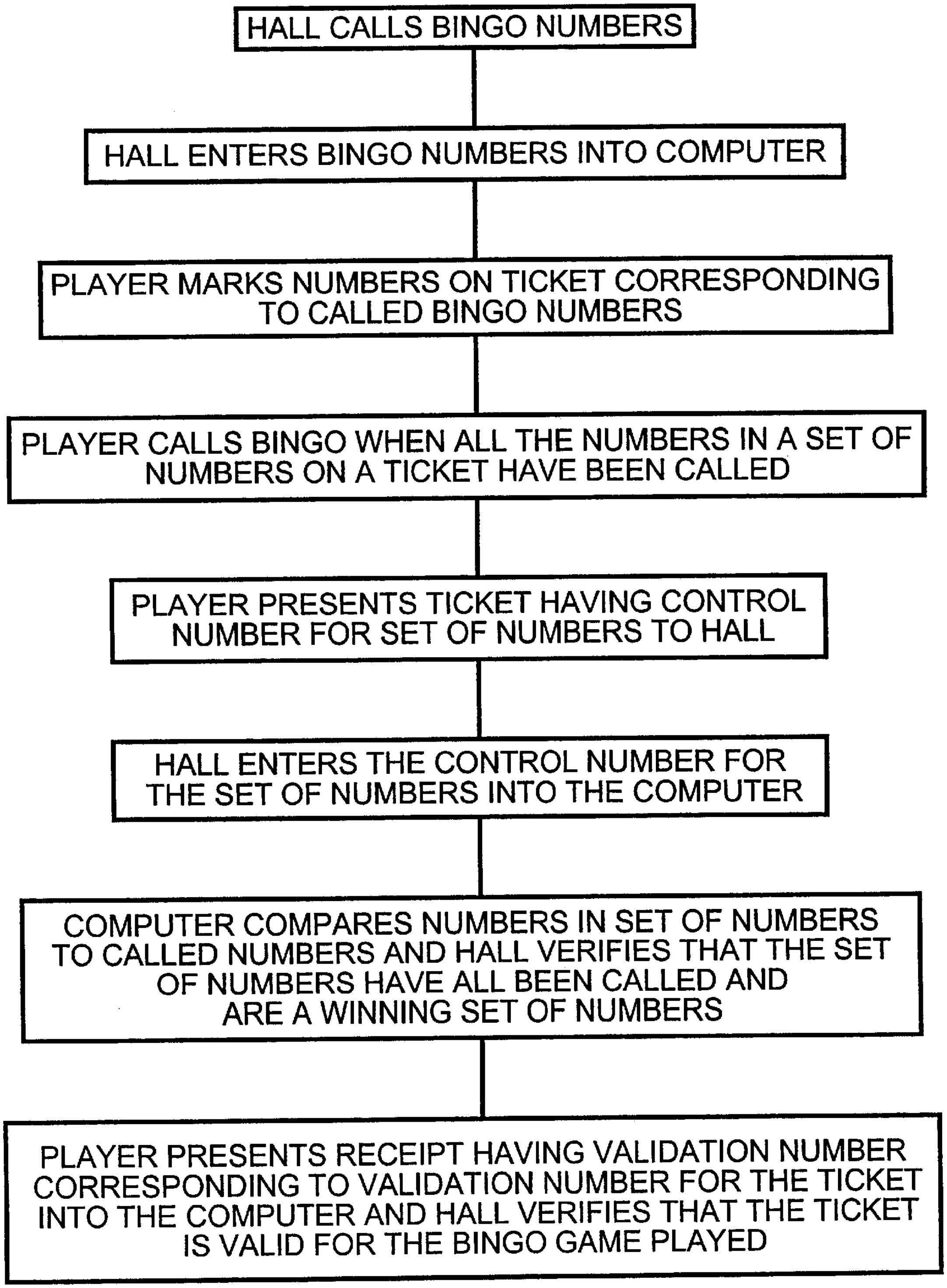
FIG. 10 is a flowchart showing the method of playing a Bingo game using the system 10 for either type of player after the set(s) of Bingo numbers 56 are purchased.

The "U-PICK-EM" Bingo game is preferably played similarly to standard Bingo games (FIG. 10). The hall randomly selects numbers and calls the numbers. Any well known means can be used to select the numbers. In the preferred embodiment, the selection of numbers and calling of numbers is not done using the computer 12. However, the computer 12 may automatically enter the Bingo numbers as they are selected or called. The computer 12 can use a ball call interface to automatically enter the winning Bingo numbers into the computer 12. A ball call interface is a device that reads the Bingo numbers once they are called and placed into the ball call blower rack. Alternatively, the Bingo numbers can be manually entered into the computer 12. As the numbers are called, each player marks their ticket 52, game board 54 or electronic Bingo device 26 appropriately. When a player or players have covered all of the numbers of a set of numbers 56, the player signals a Bingo. Alternatively, where the game is a matrix game, the player would signal when all the numbers in either a row or column on the ticket 52 is covered. Therefore in a matrix game, a winning set of numbers 56 may not be a set of numbers 56 selected by a player but rather include a single number for each set of numbers 56 selected by a player. When a player signals a Bingo, the player shows his ticket 52 and receipt 50 to the hall. The hall enters the control number 58 of the set of numbers 56 forming the winning Bingo into the computer 12. The computer 12 compares the player's set of numbers 56 with the called numbers. The computer 12 then indicates whether the set of numbers 56 was sold for that particular session and whether the set of numbers 56 is a winning set of numbers 56. If the set of numbers 56 is verified as a winning set, the set of numbers 56 is preferably displayed on monitors 24 in the hall so that the remaining players can see the winning set of numbers 56. To collect a winning jackpot, the player must show his original receipt 50 to the hall. The hall compares the validation numbers 60 of the receipt 50 and ticket 52 to confirm that the ticket 52 was purchased for that particular session.

It is intended that the foregoing description by only illustrative of the present invention and that the present invention be limited only by the hereinafter appended claims.

We claim:

1. A system for managing a game of Bingo which comprises:

(a) a computer having a central processing unit (CPU) and a memory;

(b) an input device connected to the computer;

(c) an output device connected to the computer; and (d) a computer program operating on the computer enabling:

(i) input of at least two sets of Bingo numbers preselected by a player without payment by the player;

(ii) storage of the sets of Bingo numbers preselected by the player in the memory of the computer;

(iii) assignment of a single player identifier unique to the player for the sets of Bingo numbers preselected by the player and stored in the memory of the computer wherein the player identifier is assigned to the sets of Bingo numbers for multiple sessions of Bingo;

(iv) retrieval of all the sets of Bingo numbers using the player identifier;

(v) selection, upon retrieval of all the sets of Bingo numbers, of at least one of the sets of Bingo numbers preselected by the player and stored in the memory of the computer, for play in a selected game of Bingo in a specific session of Bingo;

(vi) assignment by the computer of a control number for each set of Bingo numbers selected for play in the selected game of Bingo;

(vii) payment by the player of an amount necessary to purchase the selected Bingo numbers for play in the selected game of Bingo;

(viii) output of a receipt with the control number, the set of Bingo numbers selected for play in the selected game of Bingo and a validation number;

(ix) input into the computer of the control number of a potentially winning set of Bingo numbers for verification that the potentially winning set of Bingo numbers is a winning set of Bingo numbers; and (x) input into the computer of the validation number for verification of the winning set of Bingo numbers.

2. The system of claim 1 wherein the computer system or a second computer system with a second program enables use of the validation number to receive an output of the set of Bingo numbers selected for play in the selected game of Bingo to be used by the player for the selected game of Bingo.

3. The system of claim 1 wherein the player inputs the set of Bingo numbers which is preselected into the computer using the input device.

4. The system of claim 1 wherein a portable terminal is configured to be connected to the CPU to receive the sets of Bingo numbers selected by the player from the sets of Bingo numbers preselected by the player and stored in the memory of the computer and paid for by the player after selection for play in a selected game of Bingo.

5. A method for playing a game of Bingo which comprises the steps of:

(a) providing a computer having a central processing unit (CPU) and a memory;

(b) providing an input device connected to the computer;

(c) providing an output device connected to the computer;

(d) providing a computer program capable of operating on the computer;

(e) inputting at least two sets of Bingo numbers preselected by a player into the computer for repetitive play in games of Bingo over a period of time;

(f) storing the sets of Bingo numbers preselected by the player in the memory of the computer;

(g) assigning a single player identifier unique to the player to the sets of Bingo numbers preselected by the player and stored in the memory of the computer for multiple sessions of Bingo;

(h) retrieving all the sets of Bingo numbers preselected by the player and stored in the memory of the computer using the single player identifier;

(i) selecting at least one set of Bingo numbers preselected by the player and stored in the memory of the computer for play in a selected game of Bingo in a specific session of Bingo;

(j) assigning a separate control number for each set of Bingo numbers selected for play in the selected game of Bingo;

(k) paying an amount necessary to purchase the sets of Bingo numbers selected for play in the selected game of Bingo in the specific session of Bingo to enable the player to play the sets of Bingo numbers selected for play in the selected game of Bingo in the specific session of Bingo;

(l) outputting a receipt having the sets of Bingo numbers selected for play in the selected game of Bingo and the control numbers;

(m) playing the game of Bingo using the sets of Bingo numbers selected for play in the selected game of Bingo wherein the player signals a Bingo to indicate one of the sets of Bingo numbers is a winning set of Bingo numbers; and (n) verifying the winning set of Bingo numbers.

6. The method of claim 5 wherein in step (n), the winning set of Bingo numbers is verified using the computer program.

7. The method of claim 5 wherein the computer or a second computer with a second program enables an output of a print of the set of Bingo numbers selected for play in the selected game of Bingo and the control number wherein the print is used by the player for the game of Bingo.

8. The method of claim 5 further comprising after step (i), the steps of:

receiving an easy pick identifier and randomly generating a random set of Bingo numbers to be played in the selected game of Bingo in response to the easy pick identifier.

9. The method of claim 8 wherein an accounting of the set of Bingo numbers preselected by the player for play in the selected game of Bingo is provided further comprising the steps of:

receiving an amount of buying points corresponding to the player;

storing the amount of buying points in the memory of the computer;

in step (g), assigning the player identifier to the buying points wherein one player identifier is assigned to the buying points and the preselected set of Bingo numbers corresponding to one player;

in step (h), retrieving the buying points along with all the sets of Bingo numbers preselected by the player;

in step (k) subtracting from the amount of buying points a number of buying points corresponding to the amount necessary to purchase the set of Bingo numbers selected by the player to be played in the selected game of Bingo;

displaying a new amount of buying points with the set of Bingo numbers to be played in the selected game of Bingo in step (h); and replacing the amount of buying points with the new amount of buying points in the memory of the computer.

10. A system for managing a game of Bingo which comprises:

(a) a computer having a central processing unit (CPU) and a memory;

(b) an input device connected to the computer;

(c) an output device connected to the computer; and (d) a computer program operating on the computer enabling:

(i) input of at least two sets of Bingo numbers preselected by a player;

(ii) storage of the sets of Bingo numbers preselected by the player in the memory of the computer;

(iii) assignment of a single player identifier unique to the player to the sets of Bingo numbers preselected by the player and stored in the memory of the computer wherein the player identifier is assigned to the sets of Bingo numbers for multiple sessions of Bingo;

(iv) retrieval of all the sets of Bingo numbers using the player identifier;

(v) selection, upon retrieval of all the sets of Bingo numbers, of at least one of the sets of Bingo numbers and less than all the sets of Bingo numbers preselected by the player and stored in the memory of the computer, for play in a selected game of Bingo in a specific session of Bingo;

(vi) addition by the computer of a control number for each set of Bingo numbers selected for play in the selected game of Bingo;

(vii) output of a receipt with the control number and the set of Bingo numbers selected for play in the selected game of Bingo;

(viii) input into the computer of the control number of a winning set of Bingo numbers; and (ix) verification of the winning set of Bingo numbers by means of the control number.

11. The system of claim 10 wherein the computer system or a second computer system with a second program enables an output of a print of the set of Bingo numbers selected for play in the selected game of Bingo and the control number to be used by the player for the selected game of Bingo.

12. The system of claim 10 wherein the player inputs the set of Bingo numbers which is preselected into the computer using the input device.

13. The system of claim 10 wherein an operator of the computer inputs the set of Bingo numbers which is preselected by the player using the input device.

14. The system of claim 10 wherein the output of the verification of the winning set of Bingo numbers with the control number is printed by a printer connected to the computer.

15. The system of claim 10 wherein the computer program enables selective retrieval by the player of at least one of the sets of Bingo numbers preselected by the player and stored in the memory of the computer into a portable terminal for play in the selected game of Bingo.

16. The system of claim 15 wherein the portable terminal is configured to be connected to the CPU to receive at least two of the sets of Bingo numbers preselected by the player and stored in the memory of the computer and selectively retrieved by the player for playing in a selected game of Bingo.

17. A method for playing a game of Bingo which comprises the steps of:

(a) providing a computer having a central processing unit (CPU) and a memory;

(b) providing an input device connected to the computer;

(c) providing an output device connected to the computer;

(d) providing a computer program capable of operating on the computer;

(e) inputting at least two sets of Bingo numbers preselected by a player into the computer;

(f) storing the sets of Bingo numbers preselected by the player in the memory of the computer;

(g) associating a single player identifier unique to the player to the sets of Bingo numbers preselected by the player and stored in the memory of the computer for multiple sessions of Bingo;

(h) retrieving all the sets of Bingo numbers preselected by the player and stored in the memory of the computer using the single player identifier;

(i) selecting at least one set of Bingo numbers and less than all sets of Bingo numbers preselected by the player and stored in the memory of the computer for play in a selected game of Bingo in a specific session of Bingo;

(j) outputting a receipt having the sets of Bingo numbers selected for play in the selected game of Bingo;

(k) playing the game of Bingo using the sets of Bingo numbers selected for play in the selected game of Bingo wherein the player signals a Bingo to indicate one of the sets of Bingo numbers is a winning set of Bingo numbers; and (l) verifying the winning set of Bingo numbers.

18. The method of claim 17 wherein in step (1), the winning set of Bingo numbers is verified using the computer program.

19. The method of claim 17 wherein the computer or a second computer with a second program enables an output of a print of the set of Bingo numbers selected for play in the selected game of Bingo and wherein the print is used by the player for the game of Bingo.

20. The method of claim 17 wherein in step (e), the player inputs the sets of Bingo numbers which are preselected into the computer.

21. The method of claim 17 wherein in step (e), an operator of the computer inputs the sets of Bingo numbers which are preselected by the player.

22. The method of claim 17 wherein an output of a verification of the winning set of Bingo numbers is printed by a printer.

23. A method using a programmable computer having a memory to track a set of Bingo numbers selected by a player to be played in a selected game of Bingo which comprises the steps of:

(a) receiving at least two sets of Bingo numbers preselected by the player to be played in at least one game of Bingo;

(b) storing the sets of Bingo numbers preselected by the player;

(c) assigning a single player identifier unique to the player to all the sets of Bingo numbers preselected by the player wherein the single player identifier is assigned to all the sets of Bingo numbers for multiple sessions of Bingo;

(d) retrieving all the stored sets of Bingo numbers preselected by the player using the player identifier;

(e) selecting at least one of the sets of Bingo numbers and less than all the sets of Bingo numbers preselected by the player and stored, for play in a selected game of Bingo in a specific session of Bingo;

(f) assigning a separate control identifier to each set of Bingo numbers selected by the player to be played in the selected game of Bingo;

(g) storing each set of Bingo numbers selected by the player to be played in the selected game of Bingo along with its assigned control identifier;

(h) displaying each set of Bingo numbers to be played in the selected game of Bingo along with its assigned control identifier;

(i) receiving a potentially winning control identifier corresponding to one set of Bingo numbers selected by the player to be played in the selected game of Bingo after the selected game of Bingo has been played wherein the set of Bingo numbers is a potentially winning set of Bingo numbers; and (j) verifying that the set of Bingo numbers selected by the player corresponding to the potentially winning control identifier is a winning set of Bingo numbers.

24. The method of claim 23 wherein in step (h), the set of Bingo numbers and the control identifier are displayed as a printed receipt and wherein the printed receipt is used to obtain a Bingo card having the set of Bingo numbers selected by the player for play in the selected game of Bingo.

25. The method of claim 24 wherein the printed receipt has a receipt validation number and wherein the receipt validation number is received by the computer or a second computer to obtain the Bingo card having the set of Bingo numbers selected by the player for play in the selected game of Bingo.

26. The method of claim 23 wherein in step (h), the display is received by a portable terminal.

27. The method of claim 23 wherein after step (h), and after or during the game of Bingo, winning numbers are received, wherein in step (j), the set of Bingo numbers corresponding to the potentially winning control identifier is compared to the winning numbers to determine whether the potentially winning set of Bingo numbers is the winning set of Bingo numbers.

28. The method of claim 23 wherein in step (h), the set of Bingo numbers and the control identifier is displayed as a printed receipt and wherein the printed receipt also includes a date of the selected game of Bingo, a price for the set of Bingo numbers to be played in the game of Bingo and a computer identification number.

29. The method of claim 23 further comprising after step (f), the steps of:

receiving an easy pick identifier and randomly generating a random set of Bingo numbers to be played in the selected game of Bingo in response to the easy pick identifier; and assigning a random control identifier for the random set of Bingo numbers and wherein in step (g), the random control identifier for the random set of Bingo numbers to be played in the game of Bingo is stored with the control identifier for the set of Bingo numbers to be played in the selected game of Bingo.

30. The method of claim 23 wherein an accounting of the set of Bingo numbers preselected by the player for play in the selected game of Bingo is provided further comprising the steps of:

receiving an amount of buying points corresponding to the player;

storing the amount of buying points in the memory of the computer;

assigning the player identifier to the buying points wherein one player identifier is assigned to the buying points and the preselected set of Bingo numbers corresponding to one player;

retrieving the buying points along with all the sets of Bingo numbers preselected by the player;

subtracting from the amount of buying points a number of buying points corresponding to each set of Bingo numbers selected by the player to be played in the selected game of Bingo;

displaying a new amount of buying points with the set of Bingo numbers to be played in the selected game of Bingo in step (h); and replacing the amount of buying points with the new amount of buying points in the memory of the computer.

* * * * *